Sept. 20, 1932.  F. T. GAUSE  1,878,841
TIRE CHAIN
Filed June 28, 1929
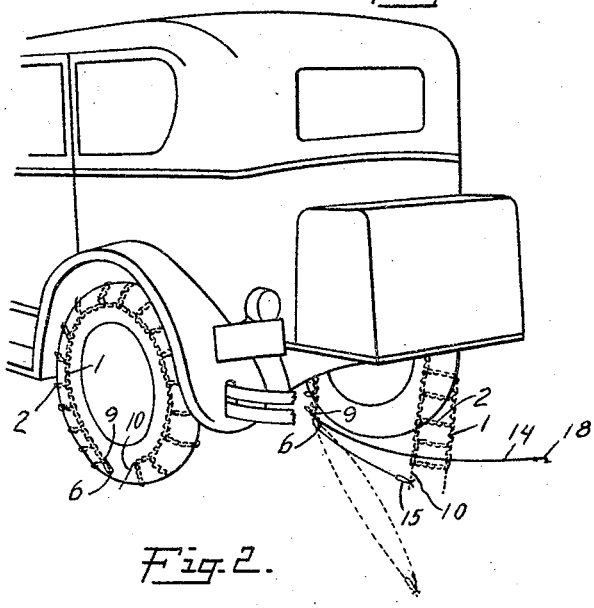
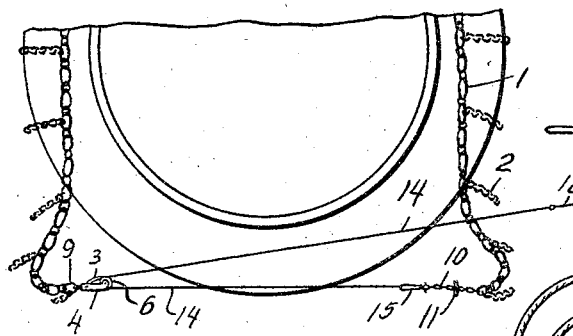
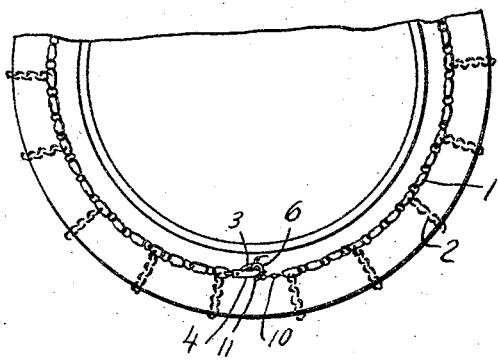
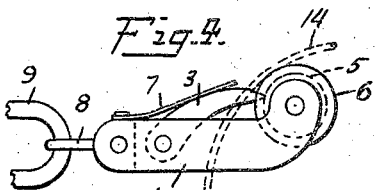
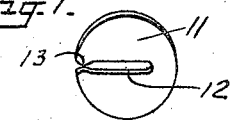
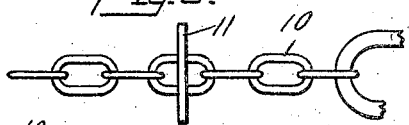
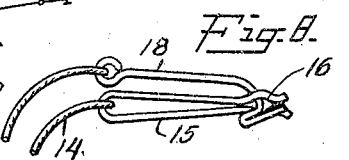
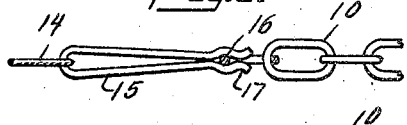
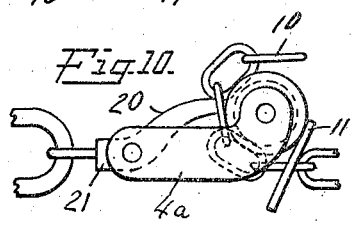
INVENTOR
Frederick Taylor Gause
BY Pennie, Davis, Marvin & Edmonds
his ATTORNEYS Patented Sept. 20, 1932

1,878,841

UNITED STATES PATENT OFFICE

FREDERICK TAYLOR GAUSE, OF WILMINGTON, DELAWARE

TIRE CHAIN

Application filed June 28, 1929. Serial No. 374,310.

This invention relates to tire chains and devices for applying the same, and has for its object to provide an improved chain construction which may be applied to the tire of an automobile without moving the car or jacking up the wheel.

A further object of the invention is to provide a construction of this character whereby the free ends of the side chains may be drawn together and fastened without directly manipulating the fastening members and without reaching under or through the wheel in the manner now necessary.

The ordinary tire chain comprises side chains, of a length slightly less than the outside circumference of the tire, the side chains being connected at intervals by cross chains intended to furnish a tractive grip where the condition of the roadway is such that the tire tends to skid or slip. Various forms of hooks are provided in the ends of the side chains by means of which they may be fastened together. In applying such chains to the wheel it is necessary either to lay out the chain in the line of movement of the car, roll the car onto the chain, and then pull the chain around the wheel and connect the ends of the side chain, or else jack up the wheel and apply the chain to the wheel while it is out of contact with the roadway. In either case it is necessary to reach around through or under the wheel to pull together the ends of the chain and connect the fasteners for the inside side chain. This is such a dirty and difficult job that the average motorist will take a chance on skidding or being stuck in the mud rather than apply chains to the wheels.

Various modifications of the chain structure have been proposed from time to time to facilitate more easy application. My prior patents, Re. 15,893, August 19, 1924, No. 1,577,014, March 17, 1926, and No. 1,627,555, May 10, 1927, disclose general structures which greatly facilitate the application of the chains to the wheels. The general structure of my present application constitutes an improvement on the chains of my prior patents above noted, particularly in that my present chain may be manufactured at a cost practically no greater than ordinary tire chains, and also in that it may be more quickly applied and when once applied presents no projecting parts or loose ends which must be held in place by supplementary attaching devices.

A specific embodiment of my improved chain and a modified form thereof are disclosed in the accompanying drawing forming part of this application, and in said drawing:

Fig. 1 is a perspective of the rear portion of an automobile showing one step in the procedure employed in applying my improved chain to the wheel;

Fig. 2 is an enlarged elevational view of an automobile wheel showing a further step in the procedure of applying the chain;

Fig. 3 is a similar view showing the inside of the tire after the chain is applied;

Figs. 4 and 5 are detail views on an enlarged scale of the fastening device at one end of the chain;

Fig. 6 is an elevational view of the attaching device at the other end of the side chain;

Fig. 7 is a perspective view of a stop device used at the end of the chain;

Fig. 8 is a detail view showing the attaching implement used in connecting the free ends of the chain;

Fig. 9 is a similar view showing the implement as applied to the chain; and

Fig. 10 is a view similar to Fig. 4 showing a modification of the fastener.

Referring to the drawing, my improved chain consists of the usual side chains 1 and cross chains 2 which, except for the fastening devices at the ends of the side chains, are in nowise modified.

At one end of each side chain there is provided a fastening device such as shown in Figs. 4 and 5 and in Fig. 10. The particular device shown in Fig. 4 comprises primarily a pawl 3 pivoted between two side plates 4 with its free end pointed and projecting into a groove 5 in a wheel or roller 6 also mounted between the plates 4. The pawl is held pressed against the roller by a spring 7 and a ring 8 is provided at the opposite end of the side plates by means of which the fastening member is attached to the end link 9 of the side chain.

Attached to the other end of the side chain as indicated in Fig. 6 is a short length of chain composed of flat links 10 instead of the twisted links or looped links ordinarily employed for side chains. A detachable stop 11 of the construction shown in Fig. 7 is provided. This stop consists of a disk of metal having some resiliency, such as brass or steel, and is provided with a slot 12 extending nearly across the diameter of the disk and of a width, except at the open end of the slot, equal to the thickness of the wire or rod out of which the flat links of the chain 10 are made. Right at the end of the slot 12 the slot is slightly narrowed and the edges are rounded as indicated at 13 so that the disk may be "snapped" over the link as shown in Fig. 6, and will be held in place against accidental displacement.

To apply my improved chain to a tire I provide an attaching device shown in Figs. 1 and 2 comprising a cord or cable 14 several feet in length and a spring clip 15 of the construction shown in Fig. 9. This spring clip 15 is bent up out of a piece of spring wire to the shape shown in Fig. 9. That is to say, the wire is bent into a loop somewhat like a large cotter pin except that the wire is round and at its free ends the wire is bent so that the two legs of the loop which are in contact form an eye 16 of a size to receive the last link of the chain extension 10. The ends of the wire beyond the eye 16 are flared out as indicated at 17 so that the link may be readily forced into the eye as shown in Fig. 9.

At the other end the cord or cable 14 has preferably attached to it a short piece of wire 18 which is bent at its outer end as shown in Fig. 8 so as to be readily caught in the eye 16 for temporarily holding the free ends of the cord together.

In applying the chain to the wheel the first step is to run the cord or cable of the attaching device through the pawl-carrying fastener between the cheek plates 4 and over the pulley as indicated in dotted lines in Fig. 4, with the spring clip 15 on the under side of the pawl. The two ends of the cable are then fastened together as indicated in Figs. 1 and 8, the cable thus forming a long flexible extension to one of the side chains. The side chain is then dropped over the wheel with the end carrying the cable on the inner side and at the front if it is a rear wheel to which the chain is being applied. The middle of the chain is placed over the top of the tire with an equal amount of slack chain on each side of the wheel, so that when the free ends of the chain are drawn together they will meet at the bottom of the wheel. After the chain is dropped over the wheel in the manner described, the free ends of the cable which are fastened together, are thrown back under the wheel to a point where the end can be readily picked up from the rear. The cable can be of any desired length and is long enough to permit the end of the cable to be thrown under the wheel without coming in contact with the wheel either at the front or the back.

The two ends of the cable are then disengaged by simply pulling the member 18 out of the eye. The eye 16 is then fastened onto the end link of the short chain extension 10 in the manner shown in Fig. 9 so that a pull on the other end of the cable will draw the two ends of the chain together and will ultimately draw the end of the chain 10 between the pointed end of the pawl and the pulley 6 until the stop 11 engages the under side of the side plates 4, as shown in Fig. 3. In this position the end of the pawl will project into the second link beyond the one carrying the stop and thus lock the ends of the chain together. After the ends of the chain are drawn together in the manner described, it is only necessary to give a quick jerk to the cord to pull the spring clip 15 off of the end of the chain.

The outer fastener may be connected directly or the same procedure may be followed, that is, the cord may be run through the pawl-carrying member, the spring clip fastening over the other end of the chain and the two drawn together by the cable. It is not difficult, however, to fasten the outer side chain by hand, particularly when a fastener of the kind disclosed herein is employed. The chain extension 10 is long enough to be pushed through the pawl-carrying device without applying much tension to the chain. The wire 18 at the end of the cord may then be pushed through the end link to serve as a grip piece and the chain can be drawn tight without difficulty.

In Fig. 10 I have illustrated a modification of the pawl-carrying member. As here shown the spring for holding the pawl may be dispensed with and the pawl held in engagement with its wheel by means of the tension of the chain itself. To this end the pawl 20 is provided with an extension 21 projecting beyond the ends of the side plates 4a, the extension being in the form of a link to which the free end of the chain is attached. The pawl is shaped so that the pull on the chain will hold the pawl in contact with the roller.

It will of course be understood that my improved chain may be modified without departing from the spirit of the invention. For example, the attaching devices which I have illustrated may be employed in one side chain only as it is the inner side chain which offers the greatest difficulty in applying the ordinary chains. I prefer, however, to use my improved fastener on both side chains, as it is very easy to connect, either with or without using the cable, and provides a ready means for drawing the ends of the chain tight. The spring clip 15 is stiff enough to allow considerable pull to be applied to the cable before it releases the chain, and if the pull is steadily applied without jerking the chain may be drawn tight enough not to require any taking up after the car is moved, as is usually required when chains are applied to a car without first getting a portion of the chain under the tire.

Also, of course, the roller 5 may be dispensed with and a grooved block or similar piece substituted, or a different form of slip connection may be employed, as will be obvious.

I claim:

1. An attaching device for connecting the ends of a chain comprising a one-way fastener attached to one end of the side chain means independent of said chain for drawing the other end of the chain into said one way fastener and a connection between said means and said chain operatable at a distance from the chain for disconnecting said means from said chain.

2. An attaching device for connecting the ends of a chain comprising a one-way catch on one end of the chain, means for drawing the other end of the chain into said one-way catch, and means detachably connected to said last-mentioned end to limit the extent to which the chain can be drawn through said one-way catch.

3. An attaching device for connecting the ends of a chain comprising a one-way catch on one end of the chain, a member for drawing the other end of the chain through said one-way catch, and a releasable connection between said member and said chain controlled by a predetermined operation of said member.

4. An attaching device for connecting the ends of a chain comprising a one-way catch adjacent one end of the chain, a flexible member adapted to be detachably connected to the opposite end of said chain and drawn through said one-way catch, and means for detachably connecting the flexible member to the end of the chain comprising a spring catch carried by the flexible member and yieldingly engaging the chain in such manner as to be released by excess pull on said flexible member.

In testimony whereof I affix my signature.

FREDERICK TAYLOR GAUSE.

CERTIFICATE OF CORRECTION.

Patent No. 1,878,841. September 20, 1932.

FREDERICK TAYLOR GAUSE.

It is hereby certified that error appears in the printed specification of the above numbered patent requiring correction as follows: Page 3, line 19, claim 1, strike out the word "side"; and that the said Letters Patent should be read with this correction therein that the same may conform to the record of the case in the Patent Office.

Signed and sealed this 20th day of December, A. D. 1932.

(Seal)

M. J. Moore,
Acting Commissioner of Patents.